US010397378B2

(12) United States Patent
Guo

(10) Patent No.: US 10,397,378 B2
(45) Date of Patent: Aug. 27, 2019

(54) METHOD AND SYSTEM FOR WIRELESS DATA TRANSMISSION, CLIENT AND SERVER CONTROLLERS

(71) Applicant: SONY CORPORATION, Tokyo (JP)

(72) Inventor: Xin Guo, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/485,925

(22) Filed: Apr. 12, 2017

(65) Prior Publication Data

US 2017/0237833 A1 Aug. 17, 2017

Related U.S. Application Data

(62) Division of application No. 14/131,841, filed as application No. PCT/CN2012/078106 on Jul. 3, 2012, now Pat. No. 9,667,752.

(30) Foreign Application Priority Data

Jul. 18, 2011 (CN) .......................... 2011 1 0209436

(51) Int. Cl.
*G06F 15/16* (2006.01)
*H04L 29/06* (2006.01)
(Continued)

(52) U.S. Cl.
CPC ............ *H04L 69/08* (2013.01); *H04L 67/141* (2013.01); *H04L 67/42* (2013.01); *H04W 76/14* (2018.02)

(58) Field of Classification Search
CPC ........................................................ H04L 69/08
See application file for complete search history.

(56) References Cited

U.S. PATENT DOCUMENTS 7,028,051 B1 * 4/2006 McMullan .......... H04L 63/0209
2001/0003202 A1 * 6/2001 Mache .................... H04L 51/04
713/153

(Continued)

FOREIGN PATENT DOCUMENTS

| CN | 1744592 | 3/2006 |
|---|---|---|
| CN | 101685431 | 3/2010 |
| CN | 101763324 | 6/2010 |

*Primary Examiner* — Douglas B Blair
(74) *Attorney, Agent, or Firm* — Xsensus LLP

(57) ABSTRACT

A method for wireless data transmission, a transmission system, client controllers, and server controllers are described. The method for wireless data transmission includes: establishing management connection, the server controller establishes task management connection among the client controllers respectively; task arrangement, the server controller arranges the wireless data transmission task among the client equipment based on the information of client equipment, which is acquired from the task management connection, each client equipment is coupled with corresponding client controller; task executing, based on the arranged information of wireless data transmission task; establishing data transmission connection among the client controllers; and executing the wireless data transmission task through the data transmission connection. By using the server controllers, the wireless data transmission among client equipment can be accomplished conveniently, without an operating interface.

6 Claims, 8 Drawing Sheets

(51) Int. Cl.
*H04W 76/14* (2018.01)
*H04L 29/08* (2006.01)

(56) References Cited

U.S. PATENT DOCUMENTS

| | | | |
|---|---|---|---|
| 2008/0290987 A1* | 11/2008 | Li | G06Q 30/02 340/5.1 |
| 2008/0301580 A1* | 12/2008 | Hjelmeland Alams | G06Q 10/107 715/808 |
| 2009/0247077 A1* | 10/2009 | Sklovsky | G06F 9/445 455/41.1 |
| 2009/0290715 A1* | 11/2009 | Mityagin | G06F 21/335 380/278 |
| 2010/0077021 A1 | 3/2010 | Hsueh et al. | |
| 2010/0262701 A1* | 10/2010 | Odakura | H04L 67/14 709/228 |
| 2010/0280904 A1* | 11/2010 | Ahuja | G06Q 30/02 705/14.58 |
| 2011/0022568 A1* | 1/2011 | Kim | G06F 16/113 707/640 |
| 2011/0069187 A1* | 3/2011 | Yokota | H04N 1/00278 348/207.2 |
| 2011/0134738 A1* | 6/2011 | Pugsley | G06F 12/121 369/83 |
| 2011/0138299 A1* | 6/2011 | Pugsley | G06F 16/9535 715/748 |
| 2011/0151784 A1* | 6/2011 | Ohkita | H04B 17/20 455/41.2 |
| 2012/0124178 A1* | 5/2012 | Sparks | H04L 67/06 709/219 |
| 2012/0142332 A1* | 6/2012 | Li | H04W 8/205 455/419 |
| 2013/0006715 A1* | 1/2013 | Warkentin | G06Q 10/0639 705/7.38 |
| 2013/0103851 A1* | 4/2013 | Umeki | H04L 65/60 709/231 |

* cited by examiner

METHOD AND SYSTEM FOR WIRELESS DATA TRANSMISSION, CLIENT AND SERVER CONTROLLERS

CROSS-REFERENCE TO RELATED APPLICATION

This application is a divisional of application Ser. No. 14/131,841, filed Jan. 9, 2014, which is a national phase application of International Application No. PCT/CN2012/078106, filed Jul. 3, 2012, and claims priority to Chinese Application No. 2011-10209436.8, filed Jul. 18, 2011, the entire contents of which are incorporated herein by reference.

FIELD OF THE INVENTION

The present invention relates to a transmission method and a transmission system, and particularly to a transmission method for implementing inter-device wireless data transmission and a transmission system thereof.

BACKGROUND OF THE INVENTION

With continuous advances and developments in the digital media technology, a significant amount of data is generated in work and life. As the amount of various work documents, digital photos, voice files and video files drastically grows, it has become particularly important to safely store and easily use the valuable data materials.

For important data, generally multiple backups are created to ensure the safety. Accordingly, it is desirable that the storage device supports convenient data exchange, in addition to safe data storage. Currently, storage devices, especially those movable ones, are not equipped with a visual manipulation interface; instead, they are connected, as a peripheral, to a computer via a slot or a cable, in order to realize control of the data operation by the computer. For example, for two storage devices to exchange data, both of them have to be connected to a computer; then, a data transmission task is set through the computer; thus realizing data exchange between the two storage devices through the computer. The dependence on a computer reduces the convenience of data exchange between storage devices.

In addition, with the enormous amount of multimedia data, there is a trend for personal terminals where player units and storage units are separated, and data transmission between the two units are implemented in a wireless manner, in order to obtain a smaller personal terminal. The size of the personal terminal can be further reduced by separating the visual manipulation interface from it.

The rapid developments in wireless communications technology and semiconductor technology have brought higher transmission rate and smaller size of communication modules, allowing for high-speed inter-device wireless communication, which mainly includes such wideband communication technologies as Bluetooth, WiFi, UWB and TransferJet. A TransferJet ultra-wideband wireless transceiver module is a close proximity high-speed transmission device developed and released by SONY, which can achieve a theoretical transmission rate of 560 Mps within a distance of 2 centimeters, at a beneficial chip size. For example, chip CXD3267AGG has a Mini PCI v2.3 interface, a 153pin VFBGA package and a size of 11×11×1 mm; and chip CXD3268AGW has a SDIO v2.0 interface, a 99pin WFLGA package and a size of 8×5.5×0.78 mm. However, when the storage device or personal terminal is not equipped with a visual manipulation interface, the data cannot be obtained or controlled directly.

SUMMARY OF THE INVENTION

In view of the above, an object of the present invention is to provide a wireless data transmission system and a transmission method thereof, in which wireless data transmission between client devices without a manipulation interface is realized through a server controller.

Another object of the present invention is to provide a client controller, in a configuration where the transmission control instruction processing module and the transmission data processing module are separated, in order to achieve separation between and parallel processing of transmission control and data transmission, thus realizing control of wireless data transmission between client devices by a third party.

Another object of the present invention is to provide a server controller, by which the data transmission task between client devices equipped with a wireless data processing module can be effectively managed and monitored.

According to an embodiment of the present invention, it is provided a client controller coupled with a client device, including a transmission control instruction processing module and a transmission data processing module, wherein: the transmission control instruction processing module is configured to convert received transmission control protocol data into transmission control application data, so as to acquire information on a wireless data transmission task of the client device; and the transmission data processing module is configured to convert transmission data acquired from the client device into transmission data protocol data, so as to transmit the transmission data protocol data via a data transmission connection established between the client controller and another client controller based upon the information, or is configured to convert transmission data protocol data received via the data transmission connection into transmission data, for provision to the client device.

According to another embodiment of the present invention, it is provided a server controller, including: a connection establishment unit, configured to establish task management connections between the server controller and respective client controllers; a task setting unit, configured to set a wireless data transmission task between client devices coupled with respective client controllers based upon information on the client devices acquired via the task management connections, and to transmit information on the wireless data transmission task to the corresponding client controller via at least one of the task management connections.

According to another embodiment of the present invention, it is provided a wireless data transmission system including a plurality of client controllers and a server controller, wherein: the server controller is configured to establish task management connections between the server controller and respective client controllers, to set a wireless data transmission task between client devices coupled with respective client controllers based upon information on the client devices acquired via the task management connections, and to transmit information on the wireless data transmission task to the corresponding client controller via at least one of the task management connections, so as to establish a data transmission connection between the client controllers; and each of the client controllers receiving the information on the wireless data transmission task is configured to execute the wireless data transmission task via the data transmission connection based upon the information.

According to another embodiment of the present invention, it is provided a wireless data transmission method, including: a management connection establishment step of establishing, by a server controller, task management connections between the server controller and respective client controllers; a task setting step of setting, by the server controller, a wireless data transmission task between client devices coupled with respective client controllers based upon information on the client devices acquired via the task management connections; and a task execution step of establishing a data transmission connection between the client controllers based upon information on the set wireless data transmission task and executing the wireless data transmission task via the data transmission connection.

According to another embodiment of the present invention, it is provided a program product stored with machine readable instructions, wherein the instructions implement the transmission method above according to an embodiment of the present invention when read and executed by a machine.

According to another embodiment of the present invention, it is provided a storage medium where the program product is stored.

According to an embodiment of the present invention, wireless data transmission between client devices without a manipulation interface can be realized through the server controller. Moreover, the data transmission process between client devices equipped with a wireless data processing module can be managed and monitored through the server controller, thus facilitating reduction of the size of the client devices and lowering costs of the client devices.

According to an embodiment of the present invention, the client controller is configured such that the transmission control instruction processing module and the transmission data processing module are separated, to achieve separation between and parallel processing of transmission control and data transmission, thus realizing control of wireless data transmission between client devices by a third party.

BRIEF DESCRIPTION OF THE DRAWINGS

The above and other objects, characteristics and advantages of the present invention will become more apparent when read in conjunction with the embodiments and accompanying drawings. In the accompanying drawings, the same or similar reference numerals denote the same or similar technical features or components.

DETAILED DESCRIPTION OF THE EMBODIMENTS

The embodiments of the present invention will be described hereinafter in detail with reference to the accompanying drawings. An element or feature described with one of the accompanying drawings or embodiments may be combined with an element or feature described with one or more rest of the accompanying drawings or embodiments. It is noted that, for clarity purposes, representation and description of components and processes that are irrelevant to the present invention and known by those skilled in the art are omitted.

Figure 1:
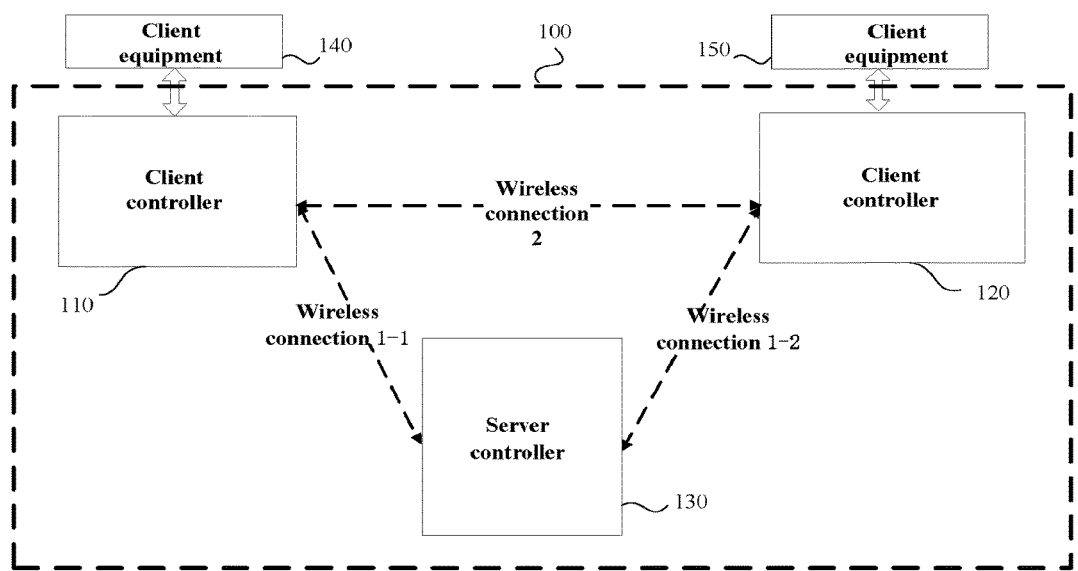
FIG. 1 is schematic diagram illustrating the configuration of a wireless data transmission system according to an embodiment of the present invention.

FIG. 1 is explanatory view of the configuration of a wireless data transmission system 100 according to an embodiment of the present invention. The wireless data transmission system 100 includes client controllers 110 and 120 and a server controller 130.

The server controller 130 can receive a data transmission request from the user through a manipulation interface, and provide data transmission service in response to the request. The client controller(s) 110 and/or 120 can realize data transmission between client devices 140 and 150 based upon a control instruction received from the server controller 130.

Specifically, the server controller 130 may establish wireless connections 1-1 and 1-2 between the server controller 130 and the client controllers 110 and 120, respectively, in order to manage a wireless data transmission task. The client controllers 110 and 120 may transmit information on the corresponding client devices 140 and 150 to the server controller 130 via the wireless connections 1-1 and 1-2, respectively. The server controller 130 may sets a wireless data transmission task between the client devices 140 and 150 based upon the information acquired, and transmit information on the set wireless data transmission task to the corresponding client controller(s) 110 and/or 120 via at least one of the task management connections 1-1 and 1-2.

Based upon the information on the wireless data transmission task, a data transmission connection may be established between the client controllers 110 and 120. For example, the client controller (e.g., client controller 110) of a data sending party may establish a data transmission connection with the client controller (e.g., client controller 120) of a data receiving party. Moreover, the client controller(s) 110 and/or 120 may execute the set wireless data transmission task via the data transmission connection. During the execution of the task, the server controller 130 may monitor the data transmission process according to control information acquired from the client controllers 110 and 120.

Figure 2:
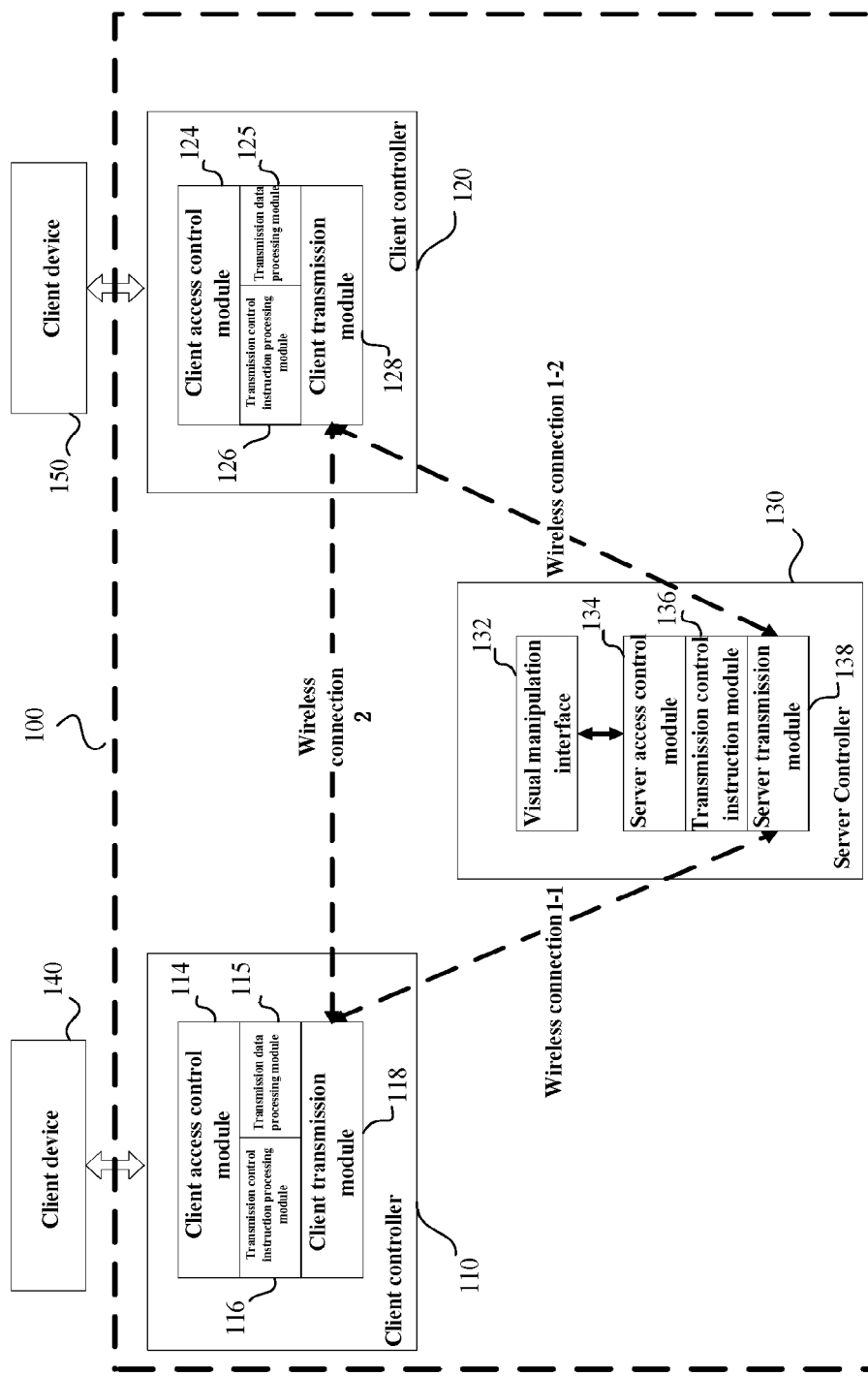
FIG. 2 is explanatory view illustrating the functional configuration of the components of the wireless data transmission system shown in FIG. 1 according to an embodiment of the present invention.

FIG. 2 is explanatory view illustrating the functional configuration of the components of the wireless data transmission system 100 shown in FIG. 1 according to an embodiment of the present invention. As shown in FIG. 2, the server controller 130 may include a visual manipulation interface 132, a server access control module 134, a transmission control instruction processing module 136 and a server transmission module 138.

The visual manipulation interface 132 is configured to display client data acquired from the server access control module 134 and to provide a corresponding control operation.

The server access control module 134 provides a server control application, transmits "transmission control application data" generated by the control application to the transmission control instruction processing module 136, and associates the received "transmission control application data" with a corresponding control application.

The transmission control instruction processing module 136 provides the conversion between "transmission control application data" and "transmission control protocol data". Specifically, the transmission control instruction processing module 136 converts the received "transmission control application data" into "transmission control protocol data" and provides the server transmission module 138 with the "transmission control protocol data"; and converts received "transmission control protocol data" into "transmission control application data" and provides the server access control module 134 with the "transmission control application data".

The server transmission module 138 transmits and receives "transmission control protocol data". Specifically, the server transmission module 138 transmits the received "transmission control protocol data" to the client controller 110 or 120 and provides the transmission control instruction processing module 136 with the "transmission control protocol data" received from the client controller 110 or 120.

The server controller 130 may be formed as an individual device. Alternatively, the server access control module 134, a transmission control instruction processing module 136 and a server transmission module 138 may be integrated together and then connected to a visual manipulation interface of some other device, to form the server controller 130. The connection method may be embedding, or may be connecting via a slot or a cable.

As shown in FIG. 2, the client controller 110 and 120 are coupled to the client devices 140 and 150, respectively, to realize access operations to the client devices 140 and 150. The connection method may be embedding, or may be connecting via a slot or a cable.

The client controller 110 may include a client access control module 114, a transmission control instruction processing module 116, a transmission data processing module 115 and a client transmission module 118.

The client access control module 114 provides a client control application, exchanges "transmission control application data" with the transmission control instruction processing module 116, and controls reading of the client device 140 according to an operation instruction acquired in the "transmission control application data" received from the transmission control instruction processing module 116. In the case that the connections to another client controller 120 are established or in the case that control information is generated during the data transmission, the client control application generates "transmission control application data", and transmits the generated "transmission control application data" to the transmission control instruction processing module 116. Besides, the client access control module 114 provides the transmission data processing module 115 with "transmission data" received from the client device 140, and provides the client device 140 with "transmission data" received from the transmission data processing module 115.

The transmission control instruction processing module 116 provides the conversion between "transmission control application data" and "transmission control protocol data". Specifically, the transmission control instruction processing module 116 converts the received "transmission control protocol data" into "transmission control application data" and provides the client access control module 114 with the "transmission control application data"; and converts the received "transmission control application data" into "transmission control protocol data" and provides the client transmission module 118 with the "transmission control protocol data".

The transmission data processing module 115 provides the conversion between "transmission data" and "transmission data protocol data". Specifically, the transmission data processing module 115 converts the received "transmission data" into "transmission data protocol data" and provides the client transmission module 118 with the "transmission data protocol data"; and converts the received "transmission data protocol data" into the "transmission data" and provides the client access control module 114 with the "transmission data".

The client transmission module 118 transmits and receives "transmission control protocol data" and "transmission data protocol data". Specifically, the client transmission module 118 transmits the received "transmission control protocol data" to the server controller 130, provides the transmission control instruction processing module 116 with the "transmission control protocol data" received from the server controller 130, transmits the received "transmission data protocol data" to the other client controller 120, and provides the transmission data processing module 115 with the "transmission data protocol data" received from the other client controller 120.

The client controller 120 may include a client access control module 124, a transmission control instruction processing module 126, a transmission data processing module 125 and a client transmission module 128. The functions carried out by the four modules with respect to the client device 150 and the server controller 130 are similar to those of the four modules in the client controller 110 with respect to the client device 140 and the server controller 130, the details of which are therefore omitted here.

In the client controllers 110 and 120, separated transmission data processing modules 115 and 125 and transmission control instruction processing modules 116 and 126 are used for the instruction flow and the data flow, to realize control of wireless data transmission between the client controllers 110 and 120 by the server controller 130.

The client controllers 110 and 120 process two types of protocol data: "transmission control protocol data" and "transmission data protocol data". The contents of them significantly differ from each other. For example, "transmission control protocol data" are used to transmit control instructions and low in data amount; and "transmission data protocol data" are used to transmit multimedia service data, high in data amount and impose a high requirement on the transmission rate. The objects of them are also different, "transmission control protocol data" are transmitted between the client controllers 110 and 120 and the server controller 130; and "transmission data protocol data" are transmitted between the client controllers 110 and 120. Therefore, the two types of protocol data may be transmitted by the same client transmission module 118 or 128; or may be transmitted by different transmission modules included in the client transmission module 118 or 128.

Figure 3:
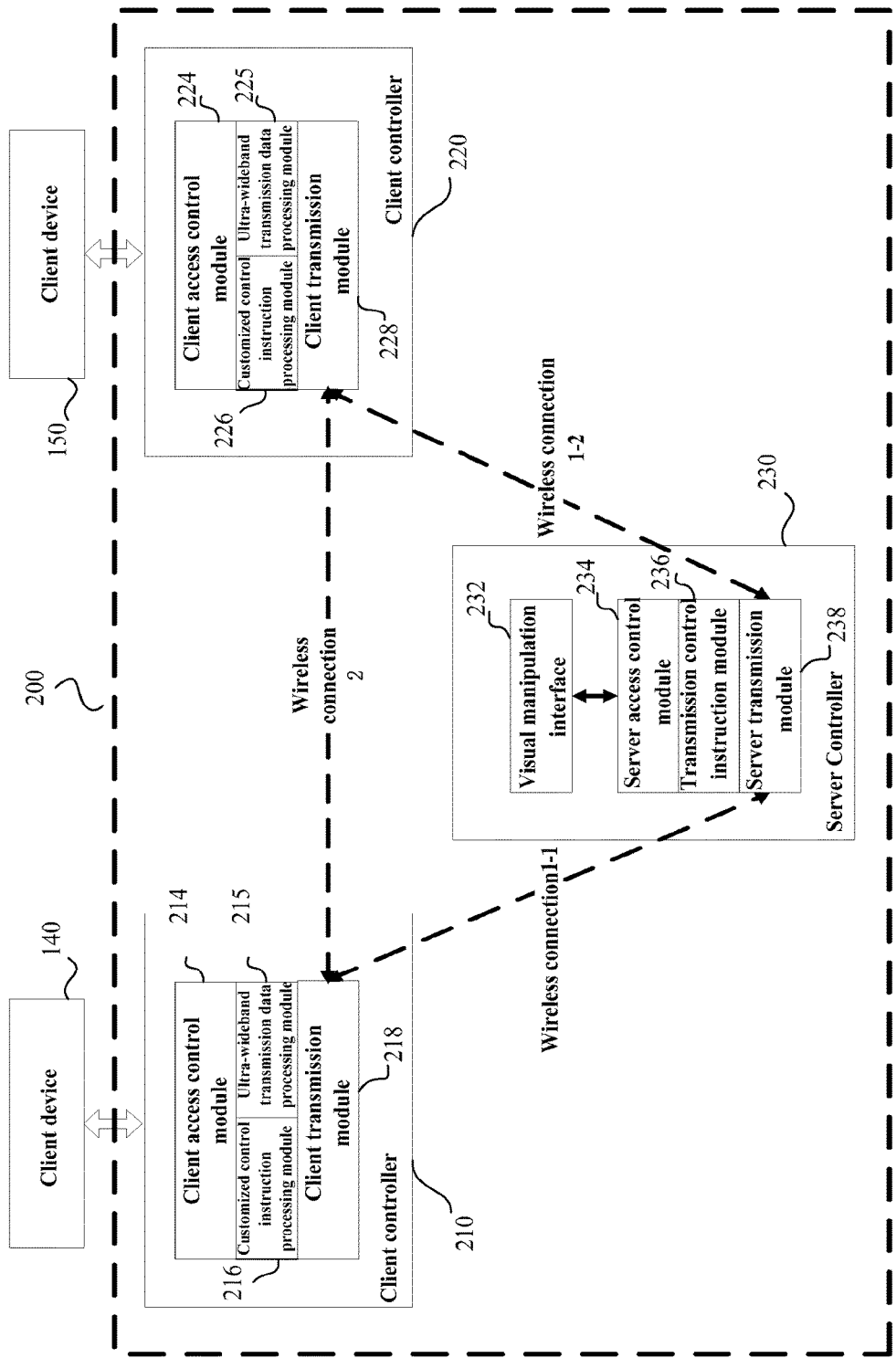
FIG. 3 is a schematic diagram illustrating an example of the functional configuration shown in FIG. 2.

FIG. 3 is a schematic diagram illustrating an example 200 of the functional configuration shown in FIG. 2. As shown in FIG. 3, "transmission control protocol data" and "transmission data protocol data" of the client controller 210 are processed by a customized control instruction processing module 216 using a "customized control instruction transmission protocol" and a ultra-wideband transmission data processing module 215 using a "ultra-wideband transmission protocol", respectively. Both of the protocols use a WiMedia baseband transmission module 218 for transmitting and receiving.

Figure 4:
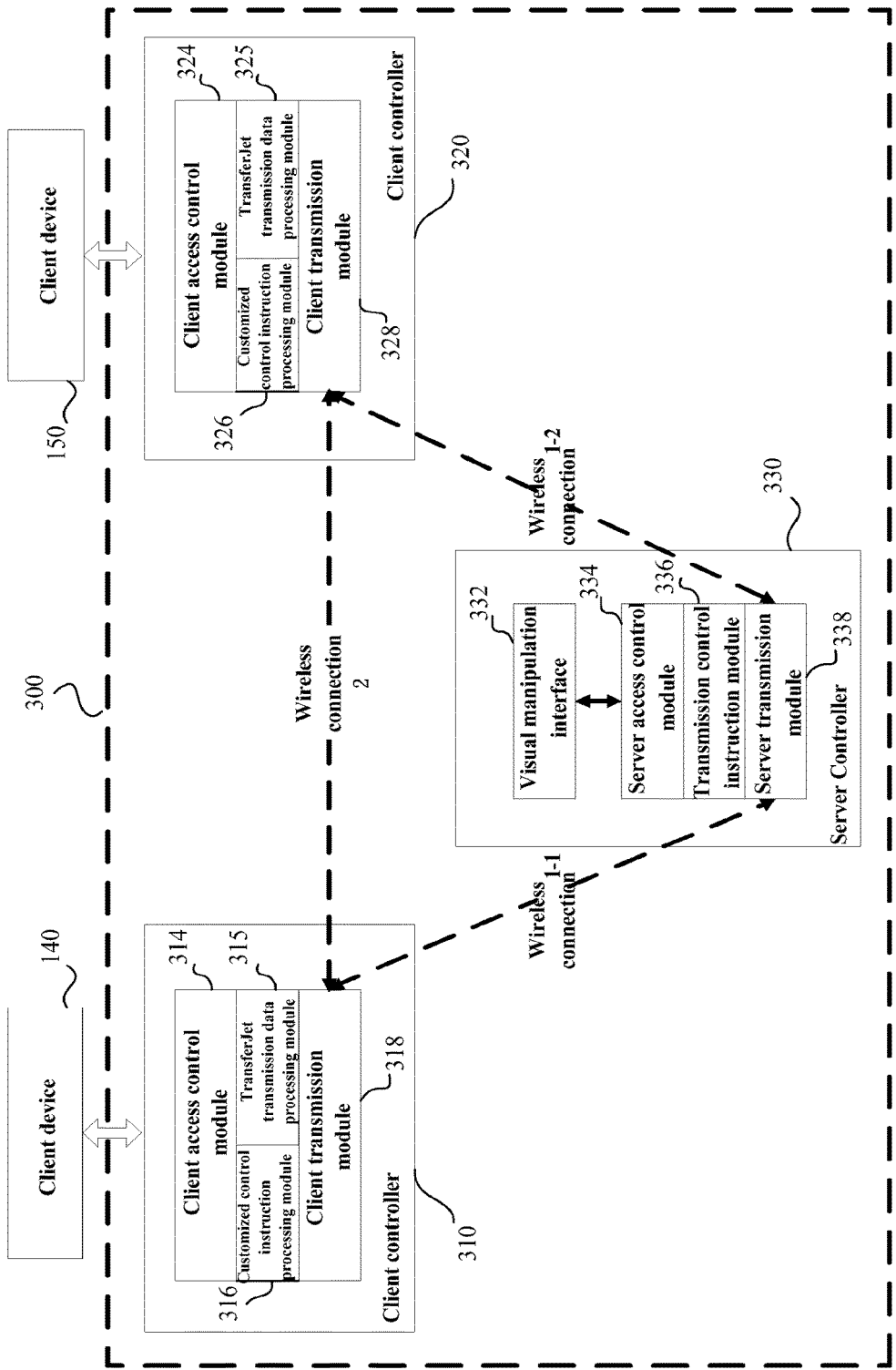
FIG. 4 is a schematic diagram illustrating another example of the functional configuration shown in FIG. 2.

FIG. 4 is a schematic diagram illustrating another example 300 of the functional configuration shown in FIG. 2. As shown in FIG. 4, "transmission control protocol data" and "transmission data protocol data" of the client controller 310 are processed by a customized control instruction processing module 316 using a "customized control instruction transmission protocol" and a TransferJet transmission data processing module 215 using a "TransferJet transmission protocol", respectively. The protocols use a WiFi transmission module 318 and a TransferJet transmission module 319, respectively.

The hardware configuration of a server controller 530 according to an embodiment of the present invention is described below by referring to FIG. 5. The server controllers shown in FIGS. 1-4 may have substantially the same hardware configuration as the server controller 530.

Figure 5:
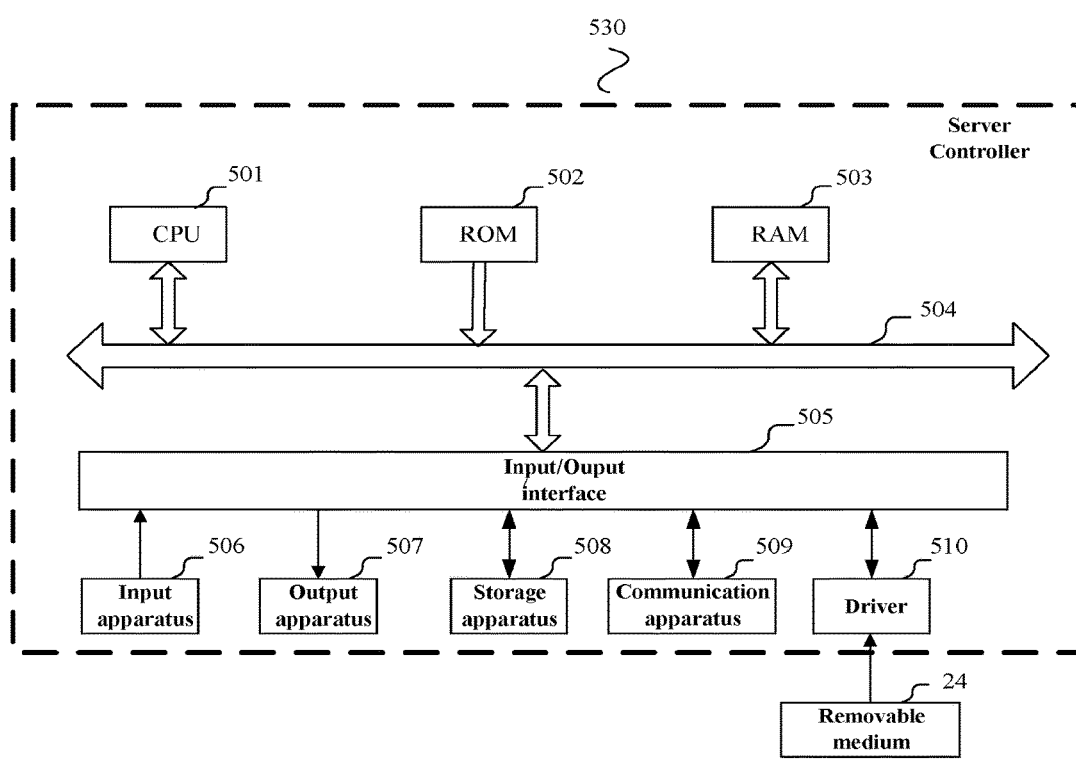
FIG. 5 is a block diagram illustrating the hardware configuration of a server controller.

FIG. 5 is a block diagram illustrating the hardware configuration of the server controller 530. The server controller 530 includes a Central Processing Unit (CPU) 501, a Read Only Memory (ROM) 502, a Random Access Memory (RAM) 503 and a bus 504. The server controller 530 further includes an input/output interface 505, an input apparatus 506, an output apparatus 507, a storage apparatus 508, a communication apparatus 509 and a drier 510.

As a processing and control apparatus, the CPU 501 controls the general operation in the server controller according to various programs. The CPU 501 may be a microprocessor. The ROM 502 stores programs and processing parameters used by the CPU 501. The RAM 503 temporarily stores programs used in the execution on the CPU 501 and parameters varying during the execution. The CPU 501, the ROM 502, and the RAM 503 are connected to one another via a bus 504 such as a CPU Bus. The input/output interface 505 is also connected to the bus 504.

To the input/output interface 505 are connected: an input apparatus 506, an output apparatus 507, a storage section 508, a communication section 509 and a driver 510.

The input apparatus 506 may include an input component for the user to input information, such as a mouse, a keyboard, a touch panel, a button, a microphone, a switch or a control stick; and an input control circuit for generating an input signal based upon a user input and transmitting it to the CPU 501. The user of the wireless data transmission system operates the input apparatus 506, to input various data or indicate a processing operation to the server controller 530.

The output apparatus 507 may include a display such as an organic light-emitting diode (OLED), a Liquid Crystal Display (LCD), or a lamp. Moreover, the output apparatus 50 may include an audio output apparatus such as a loudspeaker or an earphone. The output apparatus 507 outputs, e.g., representation content. Specifically, the display displays various types of information such as representation video data in text or images. In another aspect, the audio output apparatus converts representation audio data into sound and outputs the sound.

The storage apparatus 508 is an apparatus for data storage configured to be an instance of the storage unit of server controller 530. The storage apparatus 508 may include a storage medium, a recording apparatus for recording data on the storage medium, a reader apparatus for reading data from the storage medium and a deleting apparatus for deleting data from the storage medium. The storage apparatus 508 may be a hard disk drive (HDD). The storage apparatus 508 drives the hard disk and stores programs and data to be executed by the CPU 501.

The communication apparatus 509 is an interface for external communication. The communication apparatus 509 may include, e.g., a Bluetooth adapter, a wireless USB interface, an infrared adapter or an antenna.

The drive 510 is a reader/writer for the storage medium, which may be attached externally to or arranged inside of the server controller 530. The driver 510 reads the information recorded on a removable medium 24 of a magnetic disk, an optical disk, a magneto-optical disk, or a semiconductor memory attached thereto, and outputs the information to the RAM 503.

The server controllers shown in FIGS. 1-4 may have substantially the same hardware configuration as the server controller 530. Alternatively, the server controllers may include any of the hardware modules other than the input apparatus 506 and the output apparatus 507.

A wireless transmission method according to an embodiment of the present invention is described below with reference to FIGS. 2, 6 and 7A and 7B.

Figure 6:
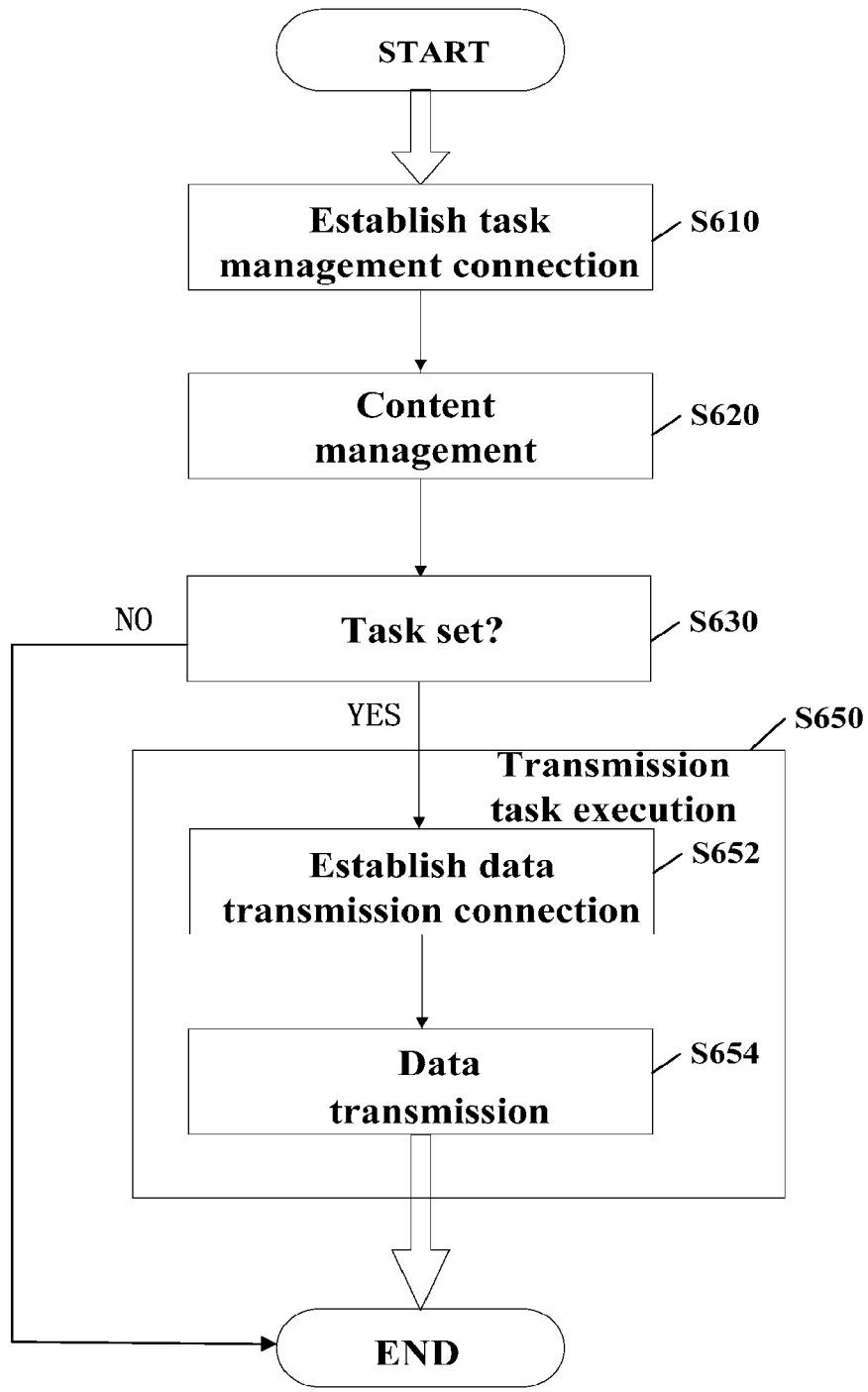
FIG. 6 is a flow chart of a wireless transmission method according to an embodiment of the present invention.

FIG. 6 is a flow chart of a wireless transmission method 600 according to an embodiment of the present invention. As shown in FIG. 6, in management connection establishment step S610, the server controller 130 establishes task management connections 1 and 2 (shown in FIGS. 7A and 7B) between the server controller 130 and respective client controllers 110 and 120, respectively, in order to manage setting and execution of data transmission task.

For example, the server control access module 134 of the server controller 130 provides a connection application: through a visual manipulation interface 132, the user can search for a target server controller to connect, and initiate connection; and a connection is established between the server controller 130 and the target client controller (e.g. the client controllers 110 and 120) according to a "transmission control instruction protocol". For example, in the wireless data transmission system 200 shown in FIG. 3, the server controller 230 connects to the target client controllers 210 and 220 using WiMedia baseband transmission modules 218, 228 and 238 and a "customized control instruction transmission protocol" designed based upon the WiMedia baseband transmission modules. In the wireless data transmission system 300 shown in FIG. 4, the server controller 330 connects to the target client controllers 310 and 320 using WiFi transmission modules 318, 328 and 338 and a "customized control instruction transmission protocol" designed based upon the WiFi transmission modules.

Once task management connections are successfully established, optionally, before setting the task, a content management step S620 may be performed, to manage the content of the client devices 140 and 150. For example, the client controllers 110 and 120 provide the server controller 130 with lists of applications available for the client devices 140 and 150 via the task management connections 1 and 2, respectively; and the server controller 130 performs content management on the client devices 140 and 150 through the applications in the lists. For example, a list of available application may include the following: file management (e.g., directory structure, file information query, file opening, modification, copying, cutting, pasting and deleting), storage space management (query on the amount of occupied space, query on the amount of remaining space), client controller management (query on identification number of the client controller, query on data transmission processing protocol used by the client).

Then, in a task setting step S630, the server controller 130 sets a wireless data transmission task between the client devices 140 and 150 based upon information on the client devices 140 and 150 acquired via the task management connections 1 and 2.

The information on the client devices 140 and 150 may include, e.g., information on files stored in the client devices 140 and 150, information on storage spaces in the client devices 140 and 150 and data transmission protocols used by the client controllers 110 and 120. The server controller 130 may obtain such information by invoking an application in the list. Alternatively, the client controllers 110 and 120 may automatically transmit the information to the server controller 130 once the connections are established.

An example of setting a wireless data transmission task may be carried out as described below. The user inputs a data transmission request through a visual manipulation interface 132. The data transmission request designates a sending party, a receiving party and transmission content. In response to the data transmission request, the server controller 130 determines whether the data transmission request can be implemented according to: whether the client controller coupled with the client device requested to send data uses the same data transmission protocol as the client controller coupled with the client device requested to receive the data; and whether the client device requested to receive the data has a sufficient storage space for the transmitted data. If it is determined that the data transmission request can be implemented, the data transmission request is set as a wireless data transmission task, and the process flow goes on to a task execution step S650; otherwise, the process ends.

Then, in the task execution step S650, a data transmission connection is established between the client controllers 110 and 120 based upon information on the set wireless data transmission task (S552), and the wireless data transmission task is executed via the data transmission connection (S554).

The information on the wireless data transmission task includes identification numbers of the client controllers 110 and 120, names of data transmission protocols used by them, and a list of files relating to the data to be transmitted.

For example, when the user activates a set data transmission task, the server controller 130 transmits a control instruction including the information on the task to the client controllers 110 and 120 via the task management connections 1 and 2. And a connection is established between the client controllers 110 and 120 according to the data transmission protocol. For example, in FIG. 3, the client controllers 210 and 220 connect using WiMedia baseband transmission modules 218 and 228 and a "ultra-wideband transmission protocol" designed based upon the WiMedia baseband transmission modules; and in FIG. 4, the client controllers 310 and 320 connect using TransferJet transmission modules 319 and 329 and a "TransferJet transmission protocol" designed based upon the TransferJet transmission modules.

Once the data transmission connection is established, files corresponding to the file list are transmitted between the client controllers 110 and 120 according to the "data transmission protocol" until the transmission ends.

In the case where the client controllers 110 and 120 are not equipped with a visual manipulation interface for displaying the transmission process, the server controller 130 is used to monitor the data transmission process. Moreover, the "data transmission protocol" for transmitting data between the client controllers 110 and 120 may generate some control information during the establishment of data transmission connection or the process of data transmission, resulting in two control modes depending on how the control information is handled, one being parallel redundancy control mode shown in FIG. 7A and the other being bypass control mode shown in FIG. 7B. Assuming the client controller 110 is the data sending party and the client controller 120 is the data receiving party, detailed control processes under the two control modes are described below.

The control process under parallel redundancy control mode is described below with reference to FIG. 7A.

Figure 7A:
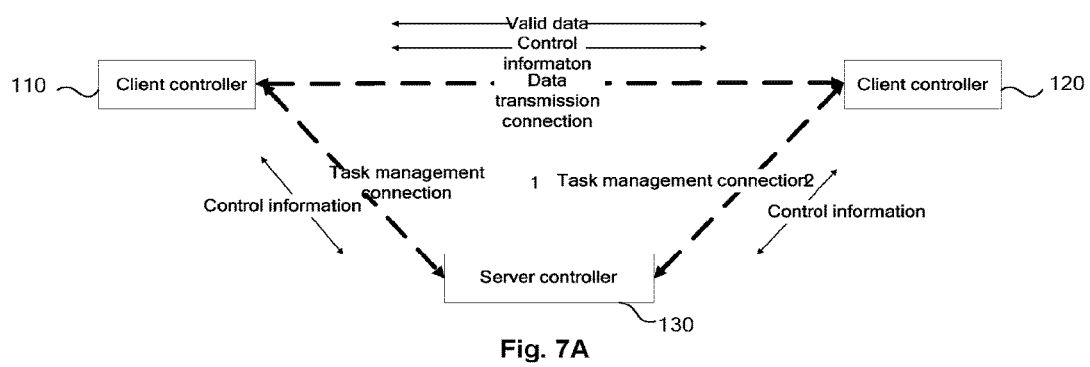
FIGS. 7A and 7B are schematic diagrams illustrating two control modes applicable in a task execution step according to an embodiment of the present invention.

During the establishment of connection or the process of data transmission, when the client access control module of the client controller 110 is to send control information such as the connection request and the number of transmitted packets, as shown in FIG. 7A, the control information is sent not only to the client controller 120 of the receiving party through a data transmission connection using a "data transmission protocol", but also to the server controller 130 through the task management connection 1 using a "transmission control instruction protocol". For example, the client access control module generates transmission control application data according to above control information, and transmits the transmission control application data to the client transmission control instruction processing module, and the transmission control application data is further converted into transmission control protocol data and transmitted to the server controller 130 by the client transmission control instruction processing module, and finally sent to the server controller 130 through the task management connection 1 by the client transmission module. Correspondingly, the server transmission module of the server controller 130 receives the transmission control protocol data and transmits the transmission control protocol data to the server control instruction processing module in order to convert the transmission control protocol data into transmission control application data. Finally the server access control module of the server controller 130 can learn the status of the data transmission connection by analyzing the transmission control application data and obtaining the control information, thereby realizing control of the data transmission connection and sending a response to the corresponding target client controller(s) 110 and/or 120. The client controller 120 of the receiving party also responds to the control information. When the client controller 110 receives a response from the client controller 120 different than the response from the server controller 130, the response from the server controller 130 is determined of higher priority. Similarly, when the client controller 120 receives a response from the server controller 130 different than the response by the client controller 120 itself, the response from the server controller 130 is determined of higher priority. The controls may include: turning off the client controllers 110 and 120 in the case of transmission success; re-performing task setting and execution in the case of transmission failure; or, setting the system into standby in the case of transmission rate dropping due to an unstable condition of the wireless link during the transmission, and re-transmitting when the wireless link is stabilized. This control mode has the advantages that data transmission between the client devices 140 and 150 can be realized using the existing high-speed data transmission protocol with modification, thus reducing implementation complexity of the system.

For example, in FIG. 4, when the client controller 310 sends control information to the client controller 320 through the wireless connection 2 (data transmission connection) using a "ultra-wideband transmission protocol", the information is also sent to the server controller 330 through the wireless connection 1-1 (task management connection) using a "customized control instruction transmission protocol". If the responses from the client controller 320 and the server controller 330 to the sent information are not the same, e.g., in the case where the link condition deteriorates, the decision made by the client controller 320 may be lowering the transmitting rate of the client controller 310 in order to reduce error rate, whereas the decision made by the server controller 320 may be putting the system into standby until the link condition recovers, then the decision made by the server controller 320 is chosen. The server controller 330 sends the chosen decision to the client controllers 310 and 320, according to which both the client controllers store their current transmission status and go into standby.

Figure 7B:
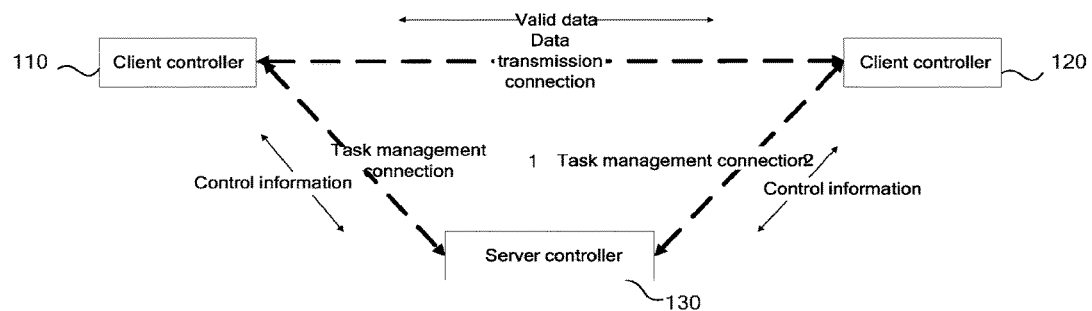

The control process under bypass control mode is described below with reference to FIG. 7B.

During the establishment of connection or the process of data transmission, when the client access control module of the client controller 110 is to send control information, as shown in FIG. 7A, the control information is sent only to the server controller 130 through the task management connection 1 using a "transmission control instruction protocol". The server controller 130 analyzes the control information to realize control of the data transmission process, and sends a response to the corresponding target client controller(s) 110 and/or 120. This control mode bypasses direct control information exchange between the client controllers 110 and 120, thus saving the bandwidth in the data transmission connection between the client devices 110 and 120 and increasing the transmission rate, at the expense of modification to the sending and receiving manner of the control information in the existing wideband transmission protocol. This control mode has the advantages that the bandwidth in the data transmission connection between the client devices 140 and 150 can be saved and the transmission rate can be increased.

For example, in FIG. 4, when the client controller 310 sends control information to the client controller 320, the information is sent to the server controller 330 through the wireless connection 1-1 (task management connection) using a "customized control instruction transmission protocol". The server controller 330 responds and sends a decision to the corresponding client controller(s) 310 and/or 320. The client controller(s) 310 and/or 320 perform subsequent operations according to the decision.

Figure 8:
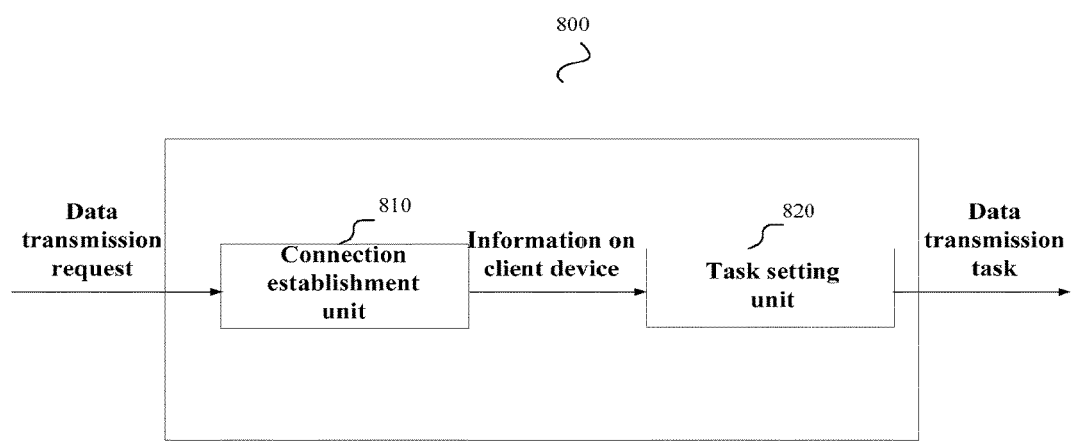
FIG. 8 is a schematic diagram illustrating an exemplary structure of a server controller according to the present invention.

FIG. 8 is a schematic diagram illustrating an exemplary structure of a server controller 800 according to the present invention. As shown in FIG. 8, the server controller 800 includes a connection establishment unit 810 configured to establish task management connections between the server controller 800 and respective client controllers 110 and 120 (see FIG. 7A). For example, in response to the received data transmission request, the connection establishment unit 800 may establish task managements connections 1 and 2 (see FIG. 7A). The server controller 800 further includes a task setting unit 820, configured to acquire information on client devices coupled with the client controllers 110 and 120 from the task management connections 1 and 2, and set a wireless data transmission task between client devices based upon the information. Moreover, the task setting unit 820 may transmit information on the wireless data transmission task to the corresponding client controller(s) 110 and 120 via the task management connection(s) 1 and/or 2.

Each of the connection establishment unit 810 and the task setting unit 820 may includes any of the functional modules of the server controller 130 shown in FIG. 2, i.e., a visual manipulation interface 132, a server access control module 134, a transmission control instruction processing module 136 and a server transmission module 138.

By using the wireless data transmission method according to an embodiment of the present invention, wireless data transmission between client devices without a manipulation interface can be realized. The data transmission may be between two storage devices, or may be between a player unit and a storage unit, may be in some other form. Moreover, since the wireless data transmission process is controlled by a server controller, the client device no longer requires a visual manipulation interface, thereby reducing the size of the client device.

In the embodiment above, the server controller manages the data transmission between two client devices through two client controllers; however, the present invention is not limited to this. For example, the server controller may establish wireless task connections to three or more client controllers, to manage wireless data transmission between client devices coupled with respective client controllers. By using the client controller according to an embodiment of the present invention in which the control instruction processing module is independent of the data processing module, third-party control of wireless data transmission by the server controller can be achieved.

In addition, it is noted that the steps in the transmission method described herein may not be performed in the chronological order shown in the flow chart. For example, the steps in the transmission method may be performed in parallel, or according to an order other than that shown in the flow chart.

Preferred embodiments of the present invention described in detail in conjunction with the accompanying drawings are for illustrative purposes only and shall not be considered as limiting the scope of the invention. Those skilled in the art will appreciate that various modifications, combinations, sub-combinations and alternations may be made according to design requirements and other factors without deviation from the scope of attached claims and their equivalents.

The invention claimed is:

1. A client controller for connection to a client device, comprising:
   a computer including instructions that when executed perform:
      receiving transmission control protocol data from a server;
      converting the transmission control protocol data which has been received from the server, which includes control instructions and includes a first data amount into converted transmission control application data which is used to acquire information on a wireless data transmission task of the client device;
      acquiring first transmission data from the client device;
      converting the first transmission data acquired from the client device into first converted transmission data protocol data which includes multimedia service data and is a second data amount which is higher than the first data amount;
      establishing a data transmission connecting between the client controller and another client controller based on the information;
      transmitting to another client controller the converted first transmission data protocol data via the data transmission connection established between the client controller and the another client controller;
      receiving from the another client controller via the data transmission connection second transmission data protocol data;

converting the second transmission data protocol data received from the another client controller via the data transmission connection into converted transmission data; and transmitting the second transmission data protocol data which has been converted to the client device.

2. The client controller according to claim 1, wherein the computer is for further processing instructions which perform:

transmitting second transmission control protocol data to a server controller of the server;

transmitting the transmission data protocol data to the other client controller; and receiving transmission data protocol data from the other client controller.

3. The client controller according to claim 2, wherein the computer is for further processing instructions which perform:

passing therethrough the transmission control protocol data comprising control information generated during establishment of the data transmission connection and/or an execution of a wireless data transmission task to the server controller via a task management connection.

4. The client controller according to claim 3, wherein the computer is for further processing instructions which perform:

transmitting the transmission control protocol data comprising the control information also to the other client controller via the data transmission connection.

5. The client controller according to claim 1, wherein:

the wireless data transmission task comprises the identification numbers of the client controller and the other client controller, the names of data transmission protocols adopted by the client controller and the other client controller and lists of files, and the client controller is a client controller of a sender which establishes the data transmission connection according to the data transmission protocols and to transmit the files in the lists to the other client controller according to the data transmission protocols.

6. The client controller according to claim 1, wherein:

the data transmission connection is established by using an Ultra Wide Band transmission protocol, or a TransferJet transmission protocol.

* * * * *